United States Patent Office 3,196,615
Patented July 27, 1965

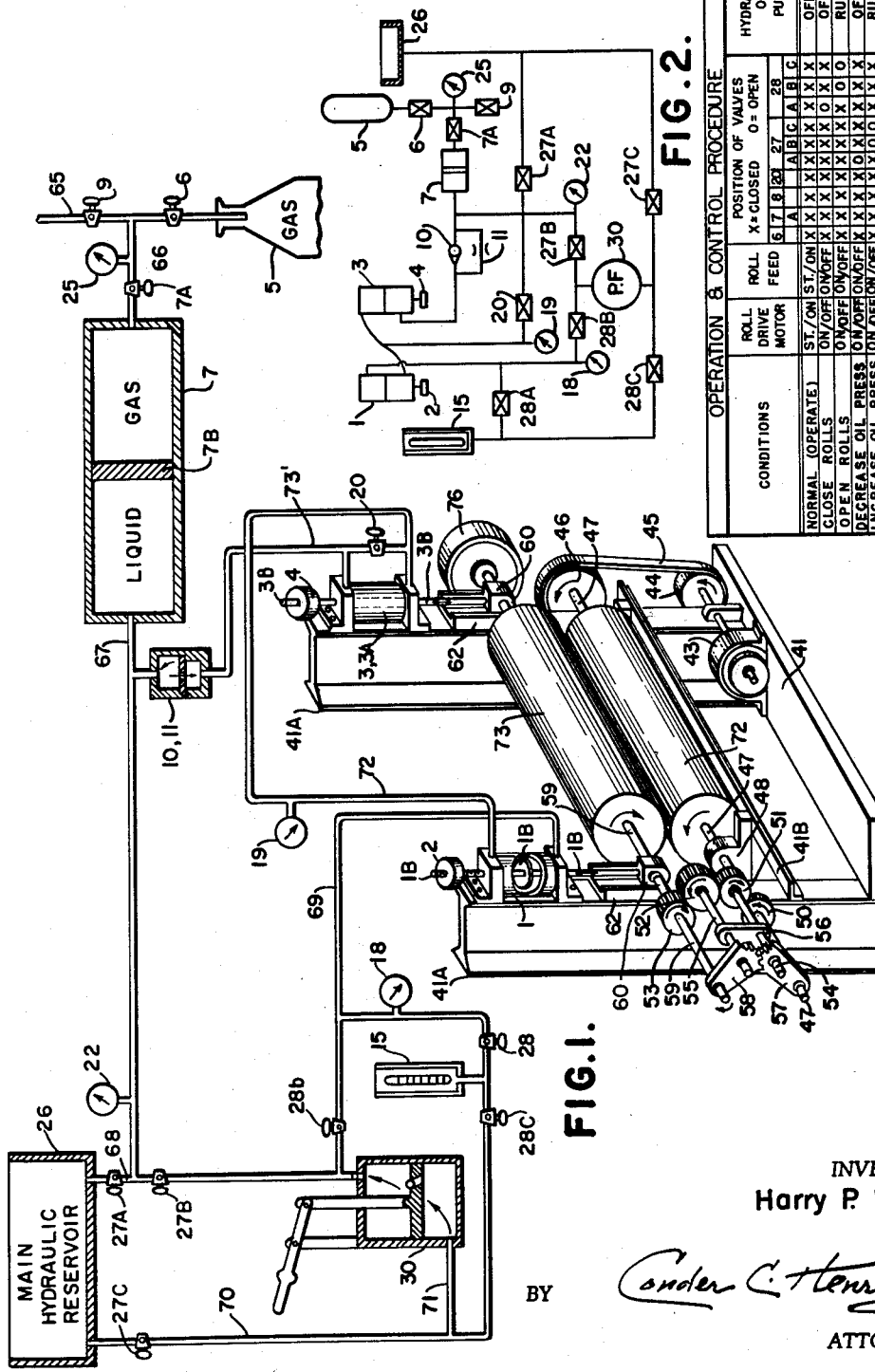

3,196,615
OVERLOAD RELEASE MECHANISMS
Harry P. Kautz, Broomfield, Colo., assignor to Mine and Smelter Supply Co., Denver, Colo., a corporation of Colorado
Original application May 4, 1961, Ser. No. 107,730, now Patent No. 3,122,992, dated Mar. 3, 1964. Divided and this application Nov. 6, 1963, Ser. No. 321,930
10 Claims. (Cl. 60—51)

My invention relates to improvements in overload release mechanisms and is a division of my co-pending application Serial No. 107,730, filed May 4, 1961, now Patent No. 3,122,992, issued March 3, 1964.

The objects of my invention are to provide a hydraulically operated overload release mechanism which will be easy to adjust, operate and repair; it will be relatively inexpensive to install, and will be efficient in operation. More particularly, the objects of my invention are to protect the drive shaft and other parts and combination of parts of machines for exerting force or pressure from being broken or damaged because of excessive loads, stresses and strains which may occur during their normal operation.

Another object of my invention is to provide for the automatic and dampened recovery and return of the machine elements to their previously adjusted operating positions and conditions after movement thereof during overload release.

A further object of my invention is to provide for the selective adjustment of a permissible load which, when exceeded, will automatically actuate a movement of the machine parts to avoid damaging stresses.

Another object of my invention is to provide means which insures maintainence of previously adjusted alignment of the drive and driven shafts of a machine after overload relief.

A further object of my invention is to indicate the amount of load to cause automatic release.

A further object of my invention is to provide for the selective adjustment of the set, i.e., the space normally required between machine pressure elements.

A further object of my invention is to indicate the set.

Other objects of my invention will become apparent as the description proceeds.

For purposes of description and illustration and as portraying the general utility of my invention, I have disclosed the same as applied to a metal rolling mill, but it will be understood that the universality of application of my invention is not so limited but may be applied to other types of force applying machines without departing from the principle of its operation.

Referring to the attached drawings:

FIGURE 1 is a perspective view of a metal rolling mill in which my invention employing two hydraulic cylinders is incorporated;

FIG. 2 is a schematic diagram of the same, and

FIGURE 3 is a table outlining the normal operation and control procedures of the invention as illustrated by FIG. 1.

More in detail, and referring to FIG. 1, the machine frame comprises a base member 41, two spaced upright I-beams 41A, and an angle bar 41B spanning and connected to the uprights. Mounted on the base member 41 is an electric motor 43 having a motor shaft to the end of which is keyed a pulley 44 for driving another pulley 46 by means of a belt 45. A primary pressure roller 72 is mounted on a primary drive shaft 47 to one end of which pulley 46 is keyed. Such shaft is journalled in bearings carried by bearing supports 48 which are rigidly secured to the angle bar 41B.

Another and secondary pressure roll 73 is disposed parallel to the first and is carried on a secondary shaft 59 journalled at each end thereof in bearing blocks 60 slidable in channels 62 secured to the faces of the uprights.

Adjacent the outer end of the primary shaft 47 opposite the end on which the pulley 46 is mounted, is keyed a primary gear 50 which meshes with a similar idler gear 51 rotatably mounted on a primary idler shaft 54. A second idler shaft 55 on which is rotatably mounted a secondary idler gear 52, is positioned parallel to shafts 47 and 54.

On one end of the secondary pressure roll shaft 59 is keyed a flywheel 76 and on its opposite end is keyed a driven gear 53 having the same number of teeth as gear 50 and meshing with gear 52, the latter of which meshes with gear 51. The said gears may be either spur or helical gears. Thus the drive and driven roll shafts are synchronized.

The primary and secondary idler shafts 54 and 55 extend through the ends of one or more gear links 56 which maintain the center line distance between them, while the center line distance between the primary shaft 47 and the primary idler shaft 54 is maintained by one or more primary gear links 57 in the ends of which shafts 47 and 54 are journaled. Similarly, the center line distance between the secondary idler gear shafts 55 and the secondary pressure roll shaft 59 is maintained by one or more secondary gear links 58 in the ends of which said shafts are journaled. Gear links 57 and 58 have meshed gear teeth on their upper ends.

An overload release mechanism is directly connected to the slidable bearing blocks 60. Such mechanism comprises two hydraulic cylinders 1 and 3 which are secured to the uprights 41A above the secondary pressure roller 73. Such cylinders contain double acting pistons 1A, 3A mounted on piston rods 1B, 3B which project from the ends of the cylinders. The lower ends of such rods are secured to the bearing blocks 60 while the opposite ends are screw threaded to receive adjusting nuts 2, 4.

In addition to the cylinders and pistons, the components utilized in precharging, bleeding, adjusting and operating my overload release mechanism comprises a gas holder or container 5; a pressurized accumulator for holding gas and oil 7, which accumulator has a floating divider or piston head 7B therein; a main hydraulic reservoir 26; a set reservoir 15; a pump 30, and a flow control combination or restrictor valve 10, 11. Such valve can be a check valve in combination with a by-pass needle valve which provides a variable orifice or restriction, or in combination with a fixed orifice by-pass, or a check valve in which the check valve gate is perforated with a fixed orifice (see FIG. 2).

The gas holder 5 is provided with a vent pipe 65 which is connected by another pipe 66 to the front or gas end of the accumulator. The other or liquid end of the accumulator is connected by a pipe 67 to another pipe 68 which in turn is connected to the bottom of the main reservoir 26. The other end of pipe 68 leads into the top chamber of the pump, and such chamber is connected to the forward chamber of cylinder 1 by a pipe 69. Also extending downwardly from the bottom of the main reservoir is another pipe 70 which terminates in a connection with pipe 69 and has a branch connection 71 with the lower chamber of the pump.

The rear or upper chamber of cylinder 1 is connected by a pipe 72 with the forward or lower compartment of cylinder 3, and the rear or upper chamber of said cylinder 3 is connected to pipe 67 by a pipe 73 through the check and restrictor valve 10, 11.

Cut off valves are included in the system as follows: Two 6 and 7A between the gas holders and accumulator, and one 9 in the vent pipe. Three 27C, 28A and 28C in line 70; two 27A and 27B in line 68, one disposed above and the other below the connection of pipe 67 with pipe 68, and one in line 73'.

Included in line 70 between valves 28A and 28C is a set oil reservoir 15 which is provided with a set level gauge 18 having appropriate markings, such as "Current Set," "Zero Set," etc. Pressure gauges are included in the system as follows: gauge 25 between valves 6 and 7A; gauge 22 in line 67; gauge 18 between valve 28A and cylinder 1, and gauge 19 in line 72.

The operation of the machine and the procedures for precharging, bleeding and adjusting the aforesaid overload release as applied to the metal rolling mill will now be described.

The motor 43 drives the primary roll shaft 47 through the pulleys 44 and 46 and belt 45. Rotary power is transmitted from primary shaft 47 to the secondary shaft 59 through the train of four intermeshed gears 50, 51, 52 and 53. Because gears 50 and 53 have the same number of teeth, rolls 72 and 73 counter-rotate at the same speed.

The primary and secondary gear links 57 and 58 maintain center line distances for proper engagement of gear teeth and at the same time position and stabilize the idler gear shafts 54 and 55 through their cogged engagement at their upper ends with each other.

In case material is introduced between the rolls which exceed the capacity of the machine or the machine becomes overloaded for any other reason, the secondary roll 73 will yield upwardly and thereby relieve the excessive stresses and strains because the assembly on which the secondary roll shaft 59 is mounted permits transit location of the econdary roll shaft axis.

The set adjustment of the rolls and their shaft assemblies as well as the movement for overloads is directly controlled by the two spaced apart double acting hydraulic cylinders 1 and 3, which cylinders have the corresponding ends of their piston rods directly connected to the slidable bearing blocks 60. Two means are provided for adjusting the downward action of the piston rods and, therefore, for adjusting the close set of the pressure rolls. They are:

First, by turning the adjusting nuts 2 and 4 clockwise or counterclockwise as they bear against the upper ends of the cylinders.

Second, by adjusting the amount of hydraulic fluid in one of the cylinders. Removing hydraulic fluid from the cylinders advances the roll assembly and reduces the set while adding fluid to the cylinders increases the set. When a fluid such as oil is regulated in only one of the two forward cylinder compartments, the motion and location of the piston of the other is controlled by movement of entrained fluid to or from the rear fluid chamber of the first cylinder through a conduit to or from the forward chamber of the second. This movement of fluid transmits synchronous motion from one bearing block 60 to the other.

As will later be described in detail, this method of setting is further implemented by controlled metering of the hydraulic fluid which is removed from or added to the forward cylinder compartment of the control cylinder, by a system of valves, a graduated fluid set reservoir and a pump. The movement or position of the piston is visually indicated by the fluid level in the set reservoir 15 which is designed to provide a greater movement in the fluid level therein than in the cylinder, for example, in the ratio of 5 to 1.

The backward stroke of the pistons 1A and 3A, which is required for the adjustment of the set of the rolls and for the relief of overload of the machine, is restricted and controlled by hydraulic and pneumatic pressures which also can be regulated. An overload in the pressure space between adjacent surfaces of the rolls forces the transitory roll 73 and its assembly, including the hydraulically operated pistons, to move upwardly away from the fixedly mounted roll 72. This motion forces liquid from the rear compartments of the cyclinders through a conduit 73' provided with a check and restrictor valve 10, 11 into the liquid compartment of the accumulator 7, which accumulator is a pressure vessel for both liquids and gas. Inasmuch as the accumulator is provided with a divider or floating piston 7B, the liquid thus entering the accumulator further compresses the captive gas. Regulation of the volume and precharged pressure of such gas determines the load in the compression space between the rolls which will cause the transit roll 73 and its assembly to retreat.

The check and restrictor valve 10, 11, which is in line 73' connecting the rear chamber of cylinder 3 to the accumulator is freely opened under liquid pressure build up but permits only restricted flow of liquid from the accumulator to line 73', allowing the roll 73 to retreat rapidly but return slowly. The same check and restrictor valve is by-passed through the relatively small orifice of a needle valve 11, in FIG. 2, thus allowing the pistons to slowly return to the selected positions of their stops when the overload ceases to exist. Of course, any other suitable system of two-way valves could be used. Thereby the machine is protected from possible serious shock stresses which might occur after an abrupt overload; the shafts are kept in alignment, and the machine is automatically reset to its previous operating position and condition.

The pump 30, when coordinated with valve manipulations, provides means for adding liquid to any or either of the piston compartments and also provides power to increase the set adjustment or increase the overload pressure adjustment. Also, the range of overload pressures can be increased by admitting gas to the forward chamber of the accumulator 7 from the gas holder 5, or gas pressure in the accumulator can be reduced by releasing gas.

Any suitable gas may be used. I have selected nitrogen because it is inert and easily obtainable.

The accumulator 7 can be precharged at the factory to the desired pressure, say 1000 p.s.i., or it can be charged on location from the bottle of compressed gas 5. Precharging the accumulator forces the piston 7B to a mechanically stopped position within the cylinder as illustrated by FIG. 1, and this provides the maximum gas volume and the minimum liquid volume. The liquid used may be oil.

As further explanatory of my invention and referring particularly to FIGS. 1 and 2, the following numbered steps outline a procedure for precharing, bleeding, adjusting and operating the assembled overload system, viz:

(1) To check or to change pressure of precharged gas, close, if necessary, all valves except valve 27A which will permit oil and entrapped air to flow from the accumulator 7 into the main hydraulic reservoir 26 where entrapped air can escape to the atmosphere, and which in turn allows the precharged gas to force the divider or piston 7B to a mechanically stopped position within the accumulator. When pressure gauges 18, 19 and 22 indicate zero hydraulic oil pressure, pressure gauge 25 will indicate the precharged gas pressure. To increase gas pressure, open valves 6 and 7A which allows pressurized gas from the bottle 5 to enter and compress the gas within the accumulator. To decrease gas pressure, open valves 7A and 9 which allows gas to escape from the accumulator to the atmosphere.

(2) Loosen the set adjustments 2 and 4 to allow complete freedom of motion for the rods and pistons of both hydraulic cylinders 1 and 3.

(3) Place set gauge block or blocks between adjacent roll surfaces.

(4) Fill the main hydraulic reservoir 26 with oil.

(5) Open valves 7A, 20, 27B, 27C and 28B. Operate pump 30 until pressure gauges 18, 19, 22 and 25 indicate slightly higher than the precharged gas pressure.

This operation will compress entrained air in all oil pressure chambers.

(6) Slowly open valves 28A and 27A. This operation will bleed entrained air from all oil chambers to the atmosphere through either of the vented reservoirs 15 and 26. Close all valves.

(7) Repeat steps 5 and 6 to bleed most of the entrained air from the system.

(8) Repeat step 5 to obtain desired overload. Close all valves.

(9) Open valves 27C and 28B. Operate pump until the secondary or transit roll 73 has been raised to a position near its limit. Close all valves.

(10) Slowly open valve 28A until the secondary or transit roll engages set gauge blocks and pressure gauge 15 indicates zero. Open valves 27C and 28B. Operate pump 30 to fill oil level indicator to the level for the predetermined roll set. Close all valves.

(11) Open valve 20 to insure hydraulic alignment of rolls as indicated by equal pressures on gauges 19 and 22. Close all valves.

(12) Open valves 27C and 28B. Operate pump until all hydraulic oil pressure gauges are indicating the overload pressure. Remove set gauge blocks. Close all valves.

(13) Slowly open valve 28A until oil in indicator 15 has returned to the level predetermined for the roll set.

In this connection it should be noted that the normal operating and control procedure is tabulated in the table constituting FIG. 3. Also, it will be apparent my overload release system may be adjusted and controlled from an instrument and control panel or cabinet remotely located from whatever type of machine to which the system may be applied.

Having thus described my invention, what I claim and desire to secure by United States Letters Patent is:

1. An overload release mechanism comprising a compartmented accumulator having a shiftable piston therein and containing gas in one compartment thereof and liquid in the other; a main liquid reservoir; a pump, and a plurality of spaced apart cylinders each of which is provided with a piston head and a piston rod connected to different parts of a force applying machine; valved conduits connecting said main liquid reservoir to said pump and to the forward compartment of one of said cylinders; a separate conduit connecting the rear compartment of the said one cylinder to the forward compartment of the other of said cylinders, and additional valved conduits interconnecting the rear compartment of the said other cylinder to said main liquid reservoir and to the liquid compartment of said accumulator through a check and resistor valve whereby movement of the piston in the said one cylinder will cause synchronous movement of the piston in the said other cylinder.

2. The combination as recited in claim 1 wherein the gas compartment of said accumulator is connected with a gas holder.

3. The combination as recited in claim 1 wherein a set reservoir is incorporated in the line of conduits connecting the said pump with the said one of said cylinders.

4. An overload release mechanism as defined in claim 1, wherein means are provided for regulating the extent of movement of the piston rods.

5. An overload release mechanism comprising: an accumulator having a floating piston therein dividing the same into two compartments, the said accumulator containing liquid in one compartment thereof and gas in the other; a first cylinder and a second cylinder having double acting pistons therein dividing the same into forward and rear compartments, the latter of which contains liquid, the said pistons being mounted on piston rods connected to a movable force applying part of a force applying machine; a main hydraulic reservoir, the said reservoir being connected by valved pipes to the forward compartment of said first cylinder; a separate conduit connecting the rear compartment of said first cylinder to the forward compartment of the said second cylinder, and a unitary combined check and resistor valve adapted to automatically and freely pass liquid therethrough in one direction and to automatically restrict the passage of liquid therethrough in the opposite direction, one end of said valve being connected to the rear compartment of said second cylinder and the opposite end of said valve being connected to the rear liquid compartment of said accumulator, the arrangement being such that the positions of the pistons in said cylinders and correspondingly the adjustment of the force applying part of the force applying machine may be adjusted to predetermined positions by admitting liquid from said main reservoir to the forward compartment only of said first cylinder and such that upon overload release when the pistons are forced backwardly by the movable part of the force applying machine, only the liquid in the rear compartment of the said second cylinder will be forced and pass freely through said check and resistor valve into the liquid compartment of the accumulator where it will force the floating piston in the accumulator backwardly and compress the gas therein and, upon overload relief of pressure in the cylinders, the compressed gas in the accumulator will slowly return liquid from the liquid compartment of the accumulator back through said valve only to the rear liquid compartment of the said second cylinder.

6. The combination set forth in claim 5 wherein a reserve gas holder is connected by a valved pipe to said accumulator.

7. The combination set forth in claim 5 wherein a set reservoir is connected by a valved pipe to the forward compartment of said first cylinder.

8. The combination set forth in claim 5 wherein a pump is interposed in the pipe lines connecting the main hydraulic reservoir to the forward compartment of said first cylinder.

9. The combination set forth in claim 5 wherein a reserve gas holder is connected by a valved pipe to said accumulator; a set reservoir is connected by a valved pipe to the forward compartment of said first cylinder, and a pump is interposed in the pipe lines connecting the main hydraulic reservoir to the forward compartment of said first cylinder.

10. An overload release mechanism as defined in claim 5, wherein means are provided for regulating the extent of movement of the piston rods.

References Cited by the Examiner

UNITED STATES PATENTS

| 2,862,360 | 12/58 | Audemar | 60—51 |
| 2,982,481 | 5/61 | Osborne et al. | 241—32 |
| 2,985,388 | 5/61 | Honeyman | 241—32 |

JULIUS E. WEST, *Primary Examiner.*

EDGAR W. GEOGHEGAN, *Examiner.*